United States Patent
Kwon et al.

(10) Patent No.: US 8,341,374 B2
(45) Date of Patent: Dec. 25, 2012

(54) SOLID STATE DRIVE AND RELATED METHOD OF SCHEDULING OPERATIONS

(75) Inventors: Mincheol Kwon, Seoul (KR); Dong jun Shin, Hwaseong-si (KR); Sun-Mi Yoo, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 364 days.

(21) Appl. No.: 12/820,449

(22) Filed: Jun. 22, 2010

(65) Prior Publication Data

US 2011/0010490 A1    Jan. 13, 2011

(30) Foreign Application Priority Data

Jul. 8, 2009    (KR) .................. 10-2009-0062193

(51) Int. Cl.
*G06F 13/14* (2006.01)
(52) U.S. Cl. .................. 711/167; 711/103; 711/111
(58) Field of Classification Search .................. None
See application file for complete search history.

(56) References Cited

U.S. PATENT DOCUMENTS

| 7,315,917 B2 | 1/2008 | Bennett et al. | |
| 2008/0195680 A1* | 8/2008 | Daynes et al. | 707/206 |
| 2010/0082879 A1* | 4/2010 | McKean et al. | 711/103 |
| 2010/0325351 A1* | 12/2010 | Bennett | 711/103 |

FOREIGN PATENT DOCUMENTS

| JP | 2007193883 A | 8/2007 |
| JP | 2008-529130 A | 7/2008 |
| KR | 1020070111470 A | 11/2007 |
| KR | 1020080045833 A | 5/2008 |
| WO | 2006078531 A3 | 7/2006 |

* cited by examiner

*Primary Examiner* — Than Nguyen
(74) *Attorney, Agent, or Firm* — Volentine & Whitt, PLLC

(57) ABSTRACT

A solid state drive (SSD) comprises an input/output interface and a memory controller. The input/output interface stores a plurality of input/output commands. The memory controller comprises first and second input/output contexts and an input/output scheduler. The first and second input/output contexts process input/output commands from the input/output interface in an alternating sequence. The input/output scheduler schedules operations of the first and second input/output contexts. In particular, the input/output scheduler suspends execution of a first input/output command by the first input/output context upon determining that an execution time of the first input/output command exceeds an interval before a deadline time. After suspending execution of the first input/output command, the input/output scheduler transmits a second input/output command to the second input/output context.

20 Claims, 8 Drawing Sheets

SOLID STATE DRIVE AND RELATED METHOD OF SCHEDULING OPERATIONS

CROSS-REFERENCE TO RELATED APPLICATIONS

This application claims priority under 35 U.S.C. §119 to Korean Patent Application No. 10-2009-0062193 filed on Jul. 8, 2009, the disclosure of which is hereby incorporated by reference in its entirety.

BACKGROUND

Embodiments of the inventive concept relate generally to electronic data storage devices. More particularly, embodiments of the inventive concept relate to solid state drives and related methods of operation.

A number of modern data storage systems incorporate flash memory devices to perform a variety of functions. Solid state drives (SSDs) constitute one such system. SSDs are now used, for instance, as replacements for hard disk drives (HDDs) in personal computers and other platforms. Such solid state drives are typically designed to incorporate large amounts of flash memory for mass data storage.

One notable shortcoming of flash memory devices is their inability to perform data overwrite operations. In particular, a region of a flash memory device cannot be programmed until any current data is removed from the region. Accordingly, a block erase operation may be required before a program operation can be performed on the region.

Flash memories are also limited in the number of times that each region can be programmed and erased before wearing out. Accordingly, in an effort to equalize the lifetimes of different regions, wear-leveling operations can be performed to move data to different regions in conjunction with new program or erase operations.

Flash memories can also be susceptible to inefficient use of memory space due to their inability to perform data overwrite operations. Accordingly, periodic merge or move operations may be used to consolidate data from physical blocks having significant numbers of invalid pages or fragmented use of space. Additionally, garbage collection operations may also be required to eliminate unused or invalid data.

Operations such as block erase operations, wear-leveling operations, merge or move operations, and garbage collection operations can delay execution of memory access operations, such as read and program operations. Accordingly, they can reduce the response time and overall performance of flash memory devices such as those used in SSDs.

SUMMARY

Selected embodiments of the inventive concept provide solid state drives capable of improving performance by reducing the response time of input/output operations.

According to one embodiment of the inventive concept, a solid state drive comprises an input/output interface storing a plurality of input/output commands, and a memory controller processing the input/output command. The memory controller comprises first and second input/output contexts that process input/output commands in an alternating sequence, wherein the input/output commands are transmitted to the first and second input/output contexts from the input/output interface, and an input/output scheduler that schedules operations of the first and second input/output contexts. The input/output scheduler suspends execution of a first input/output command by the first input/output context upon determining that an execution time of the first input/output command exceeds an interval before a deadline time, and after suspending execution of the first input/output command, transmits a second input/output command to the second input/output context.

In certain embodiments, the input/output scheduler resumes and continues execution of the first input/output command between a completion time of the second input/output command and a deadline time of the second input/output command.

In certain embodiments, the input/output scheduler stores task progress information indicating a context of the first input/output command upon suspension of the execution of the first input/output command.

In certain embodiments, the input/output interface comprises a command queue for storing the plurality of input/output commands, and further comprises a buffer for temporarily storing data corresponding to the plurality of input/output commands.

In certain embodiments, the input/output interface comprises a serial advanced technology attachment interface or a serial attached small computer system interface.

In certain embodiments, the first input/output context performs at least one of a garbage collection operation, a merge operation, a wear-leveling operation, and a block copyback operation.

In certain embodiments, the solid state drive further comprises a flash memory device that stores data programmed by one or more of the plurality of input/output commands, and a flash memory controller controlling the flash memory device according to the plurality of input/output commands.

In certain embodiments, the input/output interface comprises a command queue for native command queuing.

In certain embodiments, execution of the first input/output command requires performance of a garbage collection operation, a merge operation, a wear-leveling operation, or a block copyback operation due to the absence of a clean page or memory block in an address designated by the first input/output command.

In certain embodiments, the second input/output command comprises a read command of the SSD.

In certain embodiments, the solid state drive further comprises an over-provision area that stores data to be programmed in the designated address during the performance of the garbage collection operation, merge operation, wear-leveling operation, or block copyback operation.

According to another embodiment of the inventive concept, a method of operating a solid state drive comprises receiving a first input/output command, commencing execution of the first input/output command, and suspending execution of the first input/output command upon determining that an execution time of the first input/output command exceeds an interval prior to a deadline time of the first input/output command. The method further comprises storing task progress data of the first input/output command upon suspending execution of the first input/output command, and executing a second input/output command transmitted from the input/output interface during suspension of the first input/output command.

In certain embodiments, the method further comprises resuming execution of the first input/output command between a completion time of the second input/output command and a deadline time of the second input/output command.

In certain embodiments, the first input/output command comprises a program operation and the second input/output command comprises a read operation.

In certain embodiments, the first input/output command is designated to overwrite previously stored data, and overwriting the previously stored data comprises performing a garbage collection operation, a merge operation, a wear-leveling operation, or a block copyback operation.

In certain embodiments, the method further comprises storing a plurality of input/output commands in a command queue, and scheduling execution of the plurality of input/output commands using a native command queuing protocol.

In certain embodiments, the first and second input/output commands are memory access commands for a flash memory device.

According to still another embodiment of the inventive concept, a solid state drive comprises an input/output interface comprising a command queue that stores a plurality of input/output commands, a plurality of processors configured to communicate with a host through the input/output interface, a plurality of memory controllers, and a plurality of memory channels corresponding, respectively, to the plurality of memory controllers, each of the memory channels comprising a plurality of flash memory devices. The plurality of processors receive a plurality of input/output commands from the command queue and execute the input/output commands in an alternating fashion. A first one of the plurality of processors initiates a first input/output command and suspends the first input/output command upon determining that an expected latency of the command extends beyond a deadline of the first input/output command. A second one of the plurality of processors executes a second input/output command while the first input/output command is suspended, and the first input/output command is re-initiated during a laxity time between completion of the second input/output command and a deadline of the second input/output command.

In certain embodiments, the first input/output command comprises a program command for a flash memory device, and the second command comprises a read command.

In certain embodiments, the solid state drive further comprises an input/output command scheduler for transferring control between the first and second processors.

BRIEF DESCRIPTION OF THE DRAWINGS

Embodiments of the inventive concept are described below with reference to the accompanying drawings. In the drawings, like reference numbers denote like features.

DETAILED DESCRIPTION OF THE EMBODIMENTS

Selected embodiments of the inventive concept are described below with reference to the corresponding drawings. These embodiments are presented as teaching examples and should not be construed to limit the scope of the inventive concept.

Figure 1:
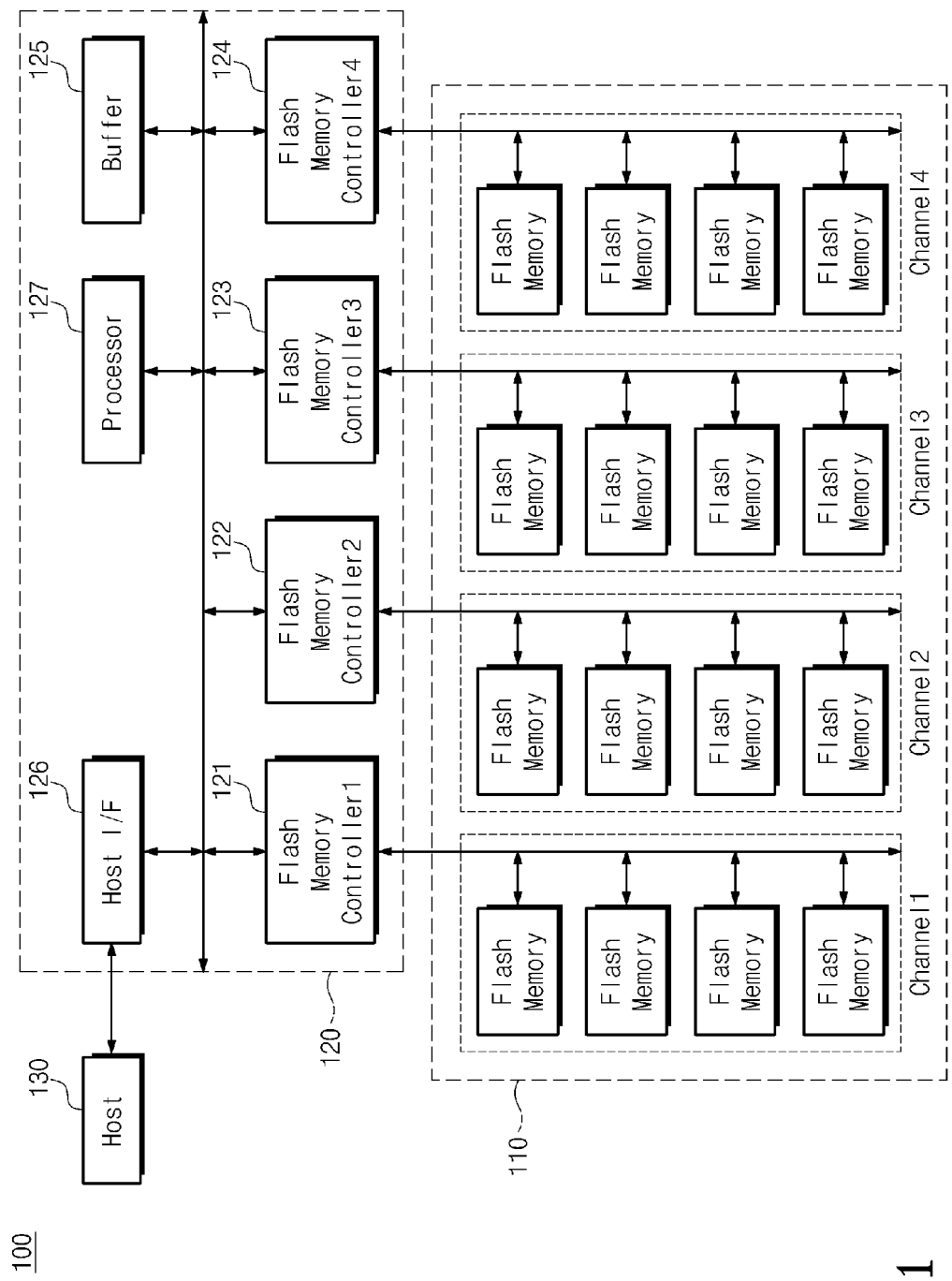
FIG. 1 is a block diagram illustrating a SSD and a host connected to the SSD according to an embodiment of the inventive concept.

FIG. 1 is a block diagram illustrating a SSD 100 and a host connected to SSD 100 according to an embodiment of the inventive concept.

Referring to FIG. 1, SSD 100 comprises a memory device 110 and a memory controller 120 for controlling memory device 110. Memory device 110 and controller 120 are connected to a host 130.

Memory device 110 is configured to provide mass data storage and can serve as a substitute for other forms of mass data storage, such as hard disk drives or optical disk drives. In this embodiment, a major storage component of memory device 110 is provided by flash memory.

Memory device 110 comprises first through fourth channels Channel1 through Channel4, and four flash memories are connected to each of first through fourth channels channel1 through channel4. In various alternative embodiments, four 2 Gbyte flash memories can be connected to each channel, additional or fewer flash memories can be connected to each of first through fourth channels Channel1 through Channel4, and/or additional or fewer channels can be included in memory device 110.

Memory controller 120 comprises first through fourth flash memory controllers 121 through 124, a buffer 125, a host interface 26, and a processor 127. Each of first through fourth flash memory controllers 121 through 124 controls a plurality of flash memories connected to respective first through fourth channels Channel1 through Channel4. In other words, first flash memory controller 121 controls a plurality of flash memories connected to first channel Channel1, second flash memory controller 122 controls a plurality of memories connected to second channel Channel2, third flash memory controller 123 controls a plurality of memories connected to third channel Channel3, and fourth flash memory controller 124 controls a plurality of memories connected to fourth channel Channel4.

Buffer 125 temporarily stores data to be transmitted to host 130, and temporarily stores data transmitted from host 130 to memory device 110. In some embodiments, buffer 125 is implemented as a dynamic random access memory (DRAM).

Host interface 126 provides an interface between memory device 110 and host 130. In certain embodiments, host interface 126 comprises a serial advanced technology attachment (SATA) interface or a serial attached small computer system interface (SAS) interface.

Processor 127 controls first through fourth flash memory controllers 121 through 124, buffer 125, and host interface 126. In certain embodiments, processor 127 is comprises an ARM7TDMI™ processor.

Host 130 transmits input/output commands to host interface 126 to initiate read or write operations of memory device 110. An input command, for instance, can instruct memory device 110 to store provided data at a provided address, and an output command, for instance, can instruct memory 110 to read and output stored data from a provided address.

Host interface 126 typically comprises a command queue for storing input/output commands received from host 130. In certain embodiments, the command queue uses native command queuing (NCQ) with a SATA2 interface.

NCQ is a command protocol that allows multiple commands to be queued in a drive, such as a hard disk drive or an SSD. A drive supporting NCQ can reorder the queued commands to improve memory access efficiency. The drive typically provides mechanisms for tracking the completion status of outstanding commands.

In the example of FIG. 1, NCQ can be implemented, for instance, by storing commands from host 130 in a command queue and transmitting the stored commands to processor 127. A command queue and its operation are described in further detail with reference to FIG. 3.

In certain embodiments, memory controller 120 of SSD 100 is driven by a real time operating system. The real time operating system can be incorporated in an embedded system to process a real time application program.

Processor 127 executes input/output commands transmitted from a command queue. The queued input/output commands, however, can be delayed by the execution of certain administrative or maintenance operations performed by processor 127, such as garbage collection operations, merge operations, wear-leveling operations, or block copyback operations. Such delays can produce a worst case input/output performance. For instance, an input/output command delayed by administrative or maintenance operations can consume a worst case amount of time. In certain situations, the worst case input/output performance can result in an input/output command missing a deadline.

The worst case input/output performance or input/output command deadline is typically related to a time-out condition of host 130. For instance, where an input/output command is not executed before the input/output command deadline, host 130 may be required to time-out or proceed with other operations prior to completion of the input/output command.

In general, where the queued input/output commands are delayed by operations such as the maintenance or administrative operations indicated above, a stall operation can be inserted in a command pipeline used to process the input/output commands. Such a stall operation, referred to as a command pipeline stall, can delay the queued input/output operations, e.g., by inserting NOPs in the queue or using another stalling technique while the maintenance or administrative operations are completed.

Figure 2:
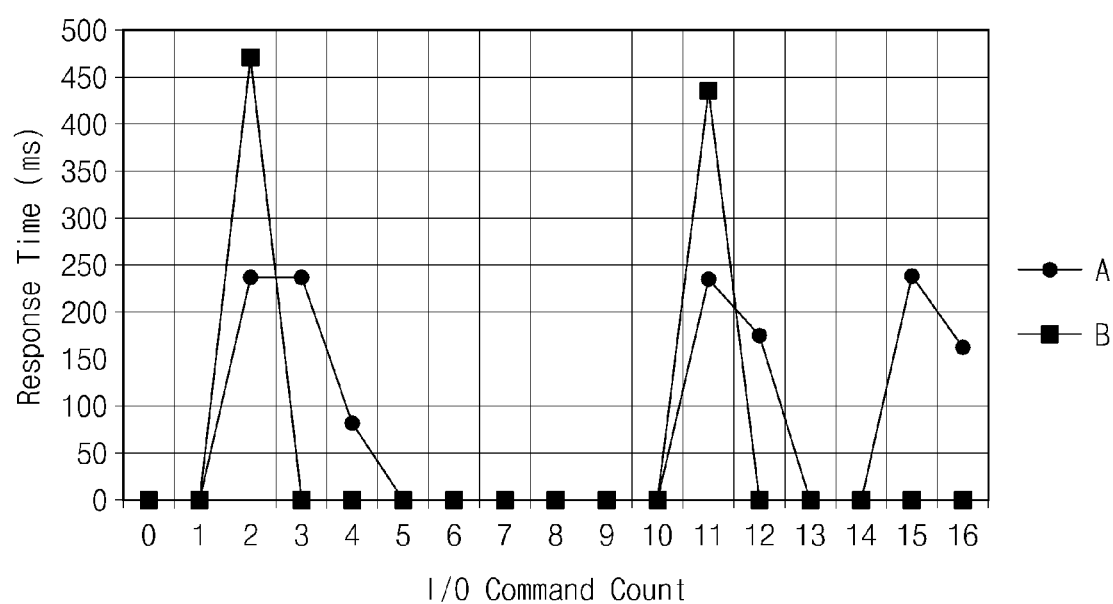
FIG. 2 is a graph illustrating a command pipeline stall in the SSD of FIG. 1.

FIG. 2 is a graph illustrating examples of command pipeline stalls in the SSD of FIG. 1. In FIG. 2, the x-axis represents the number of an input/output (I/O) operation (also referred to as an I/O command count) and the y-axis represents the response time of each operation. In FIG. 2, a line "A" represents response time of I/O operations in a system comprising a real time operating system and a command queue, and a line "B" represents response time of I/O operations in a system comprising a command queue.

In the operations illustrated by line "A", a maximum response time of 240 ms occurs at I/O command counts 2, 11 and 15, which result in stall operations. In this example, a stall operation is produced where the response time of an input/output command exceeds a predetermined threshold (e.g., about 240 ms). The stall operations cause a deterioration of performance of the SSD.

To prevent command pipeline stalls, processor 127 can be implemented with first and second input/output contexts to execute input/output commands of the command queue in an alternating sequence. The first and second input/output contexts and their operations are described in further detail through FIGS. 3 through 6.

Figure 3:
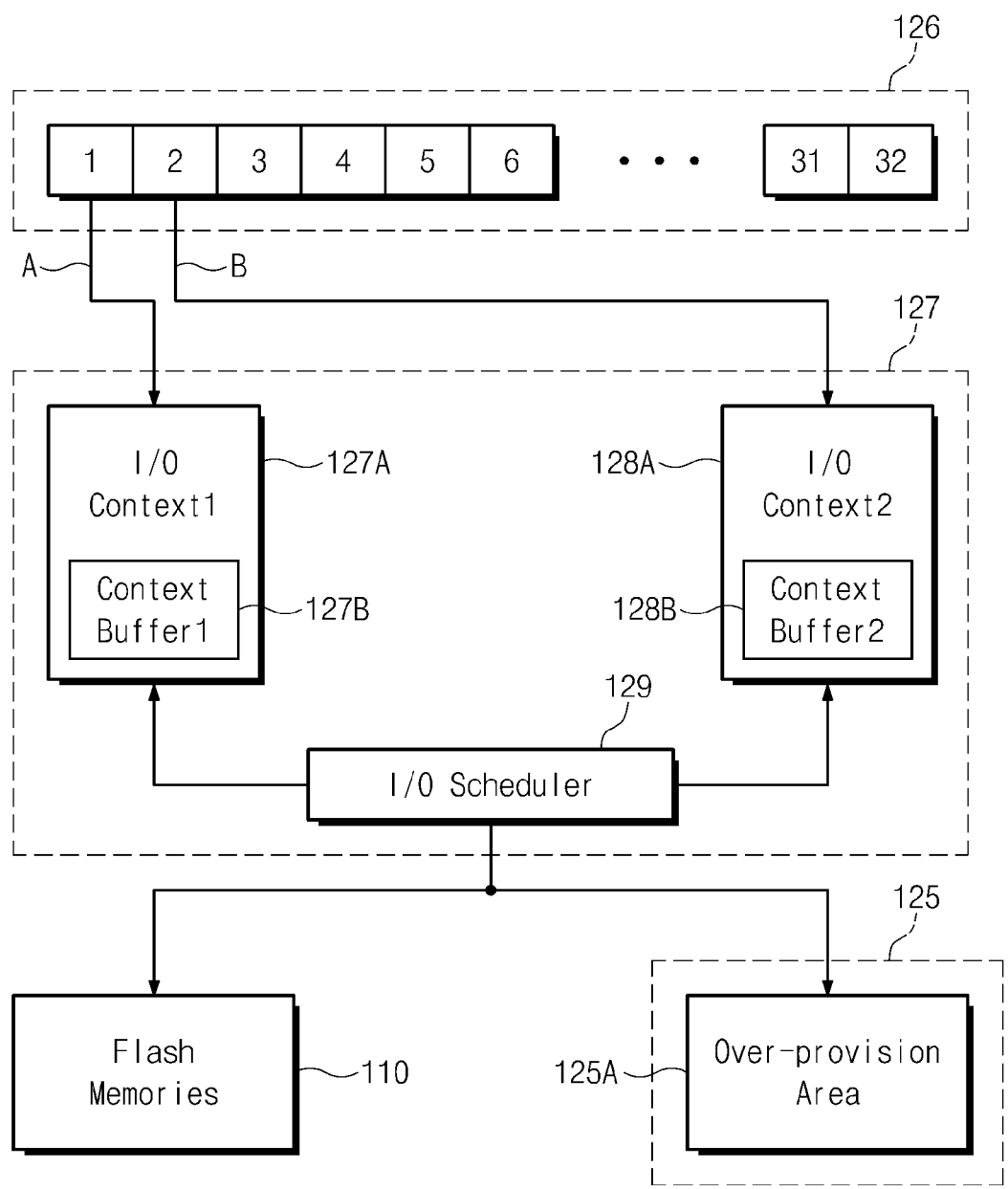
FIG. 3 is a block diagram illustrating an embodiment of the SSD of FIG. 1.

FIG. 3 is a block diagram illustrating an embodiment of SSD 100 of FIG. 1. In this embodiment, host interface 126 comprises a command queue for storing 32 input/output commands transferred from host 130. Processor 127 comprises first and second input/output contexts 127A and 128A for executing input/output commands. First and second input/output contexts 127A and 128A comprise respective first and second context buffers 127B and 128B.

First context buffer 127B stores state information of first input/output context 127A where first input/output context 127A is suspended due to a factor such as a worst case input/output performance. In addition, second context buffer 128B stores state information of second input/output context 128A where second input/output context 128A is suspended by a factor such as a worst case input/output performance. An input/output scheduler 129 controls operations of first and second input/output contexts 127A and 128A.

Input/output scheduler 129 controls first and second input/output contexts 127A and 128A to sequentially process input/output commands stored in the command queue. In addition, input/output scheduler 129 controls first and second input/output contexts 127A and 128A to sequentially process input/output commands stored in the command queue based on a priority order. For instance, in one embodiment, first input/output context 127A executes input/output commands corresponding to the worst case input/output performance, and second input/output context 128A executes input/output commands corresponding to simple program operations that do not correspond to the worst case input/output performance, as well as read operations and operations for writing data in an over-provision area 125A.

Buffer 125 comprises over-provision area 125A. Over-provision area 125A temporarily stores data to be stored in memory device 110 while memory device 110 performs an administrative or maintenance operation such as a merge operation, a block copy operation, or a garbage collection operation. Over-provision area 125A typically comprises a DRAM in buffer 125, or an additional memory besides buffer 125 and comprises a single level cell (SLC) flash memory device or a phase-change random access memory (PRAM).

In some embodiments, SSD 100 comprises further input/output contexts in addition to first and second input/output contexts 127A and 128A. In such embodiments, where first and second input/output contexts 127A and 128A both execute input/output commands having the worst case input/output performance, a new input/output command is processed through other input/output contexts.

In the embodiment of FIG. 3, first input/output context 127A receives an input/output command "A" stored in the command queue under the control of input/output scheduler 129, and executes input/output command "A". Meanwhile, second input/output context 128A receives an input/output command "B" stored in the command queue under the control of input/output scheduler 129, and executes input/output command "B".

Figure 4:
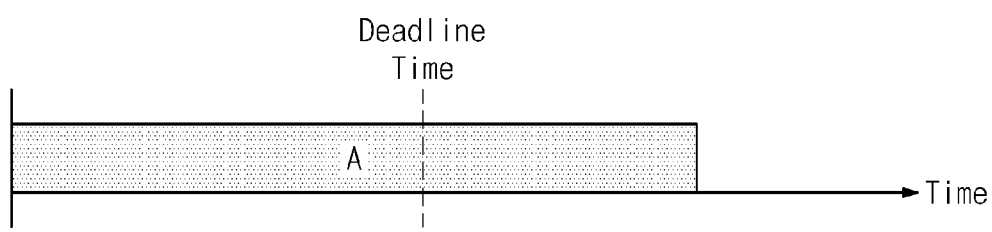
FIG. 4 is a timing diagram illustrating the execution time of an input/output command "A" shown in FIG. 3.
Figure 5:
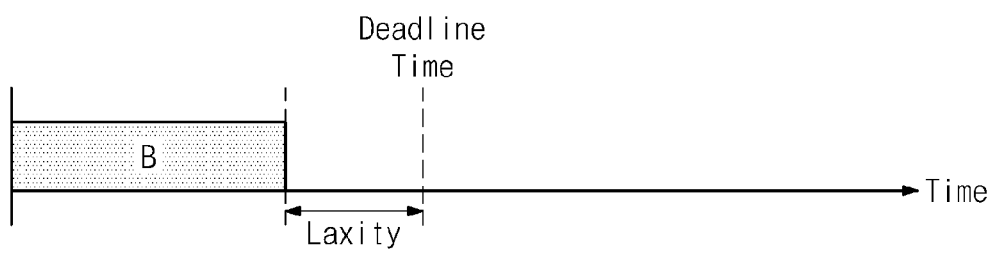
FIG. 5 is a timing diagram illustrating the execution time of an input/output command "B" shown in FIG. 3.

FIGS. 4 and 5 illustrate the execution of input output commands "A" and "B" of FIG. 3.

Referring to FIGS. 3 and 4, for example, first input/output context 127A performs an operation for programming data in memory device 110 by executing input/output command "A". In this example, it is assumed that memory device 110 has no clean page or clean block. Accordingly, memory device 110 must perform a maintenance or administrative operation such as a garbage collection operation, a merge operation, a wear-leveling operation, or a block copyback operation before executing command "A".

Due to the additional operation, the time required by first input/output context 127A to execute input/output command "A" may exceed a deadline time. Accordingly, the response time delay due to first input/output context 127A can deteriorate the performance of SSD 100. To prevent such deterioration, input/output scheduler 129 suspends an operation of first input/output context 127A and stores task progress information of first input/output context 127A in first context buffer 127B.

Thereafter, second input/output context 128A receives input/output command "B" stored in a command queue under the control of input/output scheduler 129. Second input/output context 128A executes input/output command "B". The execution of input/output command "B" by second input/output context 128A is described in further detail with reference FIG. 5.

Referring to FIGS. 3 and 5, input/output scheduler 129 controls host interface 126 to transmit input/output command "B" to second input/output context 128A. For explanation purposes, it will be assumed that input/output command "B" has a relatively short execution time. For instance, it can comprise a read operation. Second input/output context 128A performs the read operation by reading data from memory device 110. Because of its short execution time, input/output command "B" is completed before a corresponding deadline. The time between completion of the operation and the deadline is referred to as slack time or laxity.

During the laxity after completion of input/output command "B", input/output scheduler 129 resumes the suspended first input/output context 127A to complete execution of input/output command "A".

Figure 6:
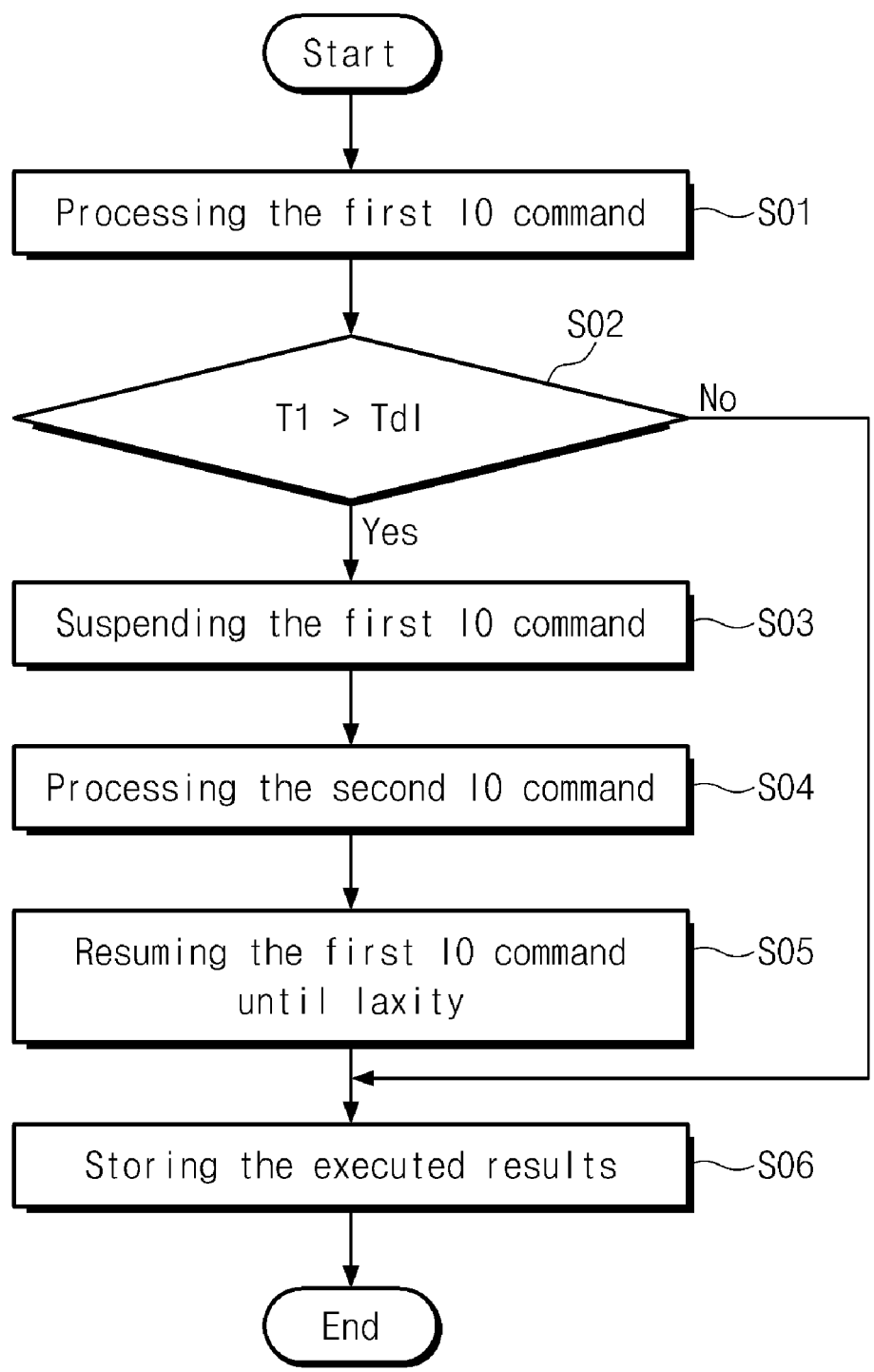
FIG. 6 is a flowchart illustrating a method of operating the SSD of FIGS. 1 and 3.

FIG. 6 is a flowchart illustrating a method of operating SSD 100 of FIGS. 1 and 3. The method of FIG. 6 will be described with reference to FIGS. 1 through 6. In the description of FIG. 6, example method steps are indicated by parentheses (SXX).

The method begins with first input/output context 127A executing a first input/output command (S01). Thereafter, input/output scheduler 129 determines whether an execution time T1 of the first input/output command by first input/output context 127A exceeds a deadline time Tdl (S02). If so (S02=Yes), input/output scheduler 129 suspends first input/output context 127A (S03) and first input/output context 127A stores task progress information in first context buffer 127B and proceeds to step S04. If not (S02=No), first input/output context 127A stores a result of the first input/output command in memory device 110 or over-provision area 125A (S06).

Following suspension of first input/output context 127A, second input/output context 128A executes a second input/output command (S04). Input/output scheduler 129 resumes first input/output context 127A during laxity after second input/output context 128A executes second input/output command (S05). Once a task of first input/output context 127A is completed, a result of the task is stored in memory device 110 or over-provision area 125A (S06).

Figure 7:
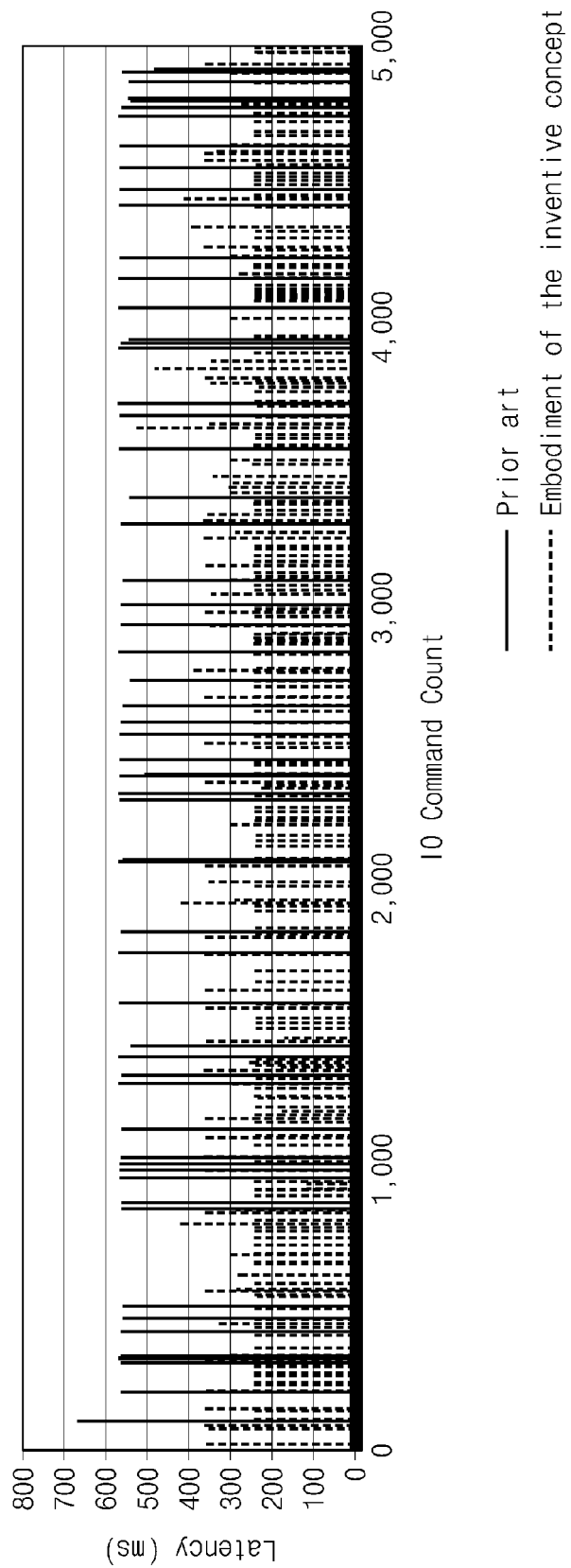
FIG. 7 is a graph illustrating the performance of the SSD of FIG. 1 compared with the performance of a conventional SSD.

FIG. 7 is a graph illustrating the performance of SSD 100 of FIG. 1 compared with the performance of a conventional SSD.

In the graph of FIG. 7, the x-axis represents I/O command count and the y-axis represents latency. Solid lines represent latency of input/output operations performed by a conventional SSD, and dotted lines represent latency of input/output operations performed by an SSD implementing the method of FIG. 6.

As indicated by the solid lines, latencies greater than 500 ms occur with relative frequency in the conventional SSD. Accordingly, based on the graph of FIG. 2, relatively numerous stall operations are required by the conventional SSD. As indicated by the dotted lines, on the other hand, most of the latencies of the SSD using the method of FIG. 6 are less than 240 ms. Accordingly, relatively fewer stall operations are required by the SSD using the method of FIG. 6, and the average response time or latency of the SSD can be reduced.

Figure 8:
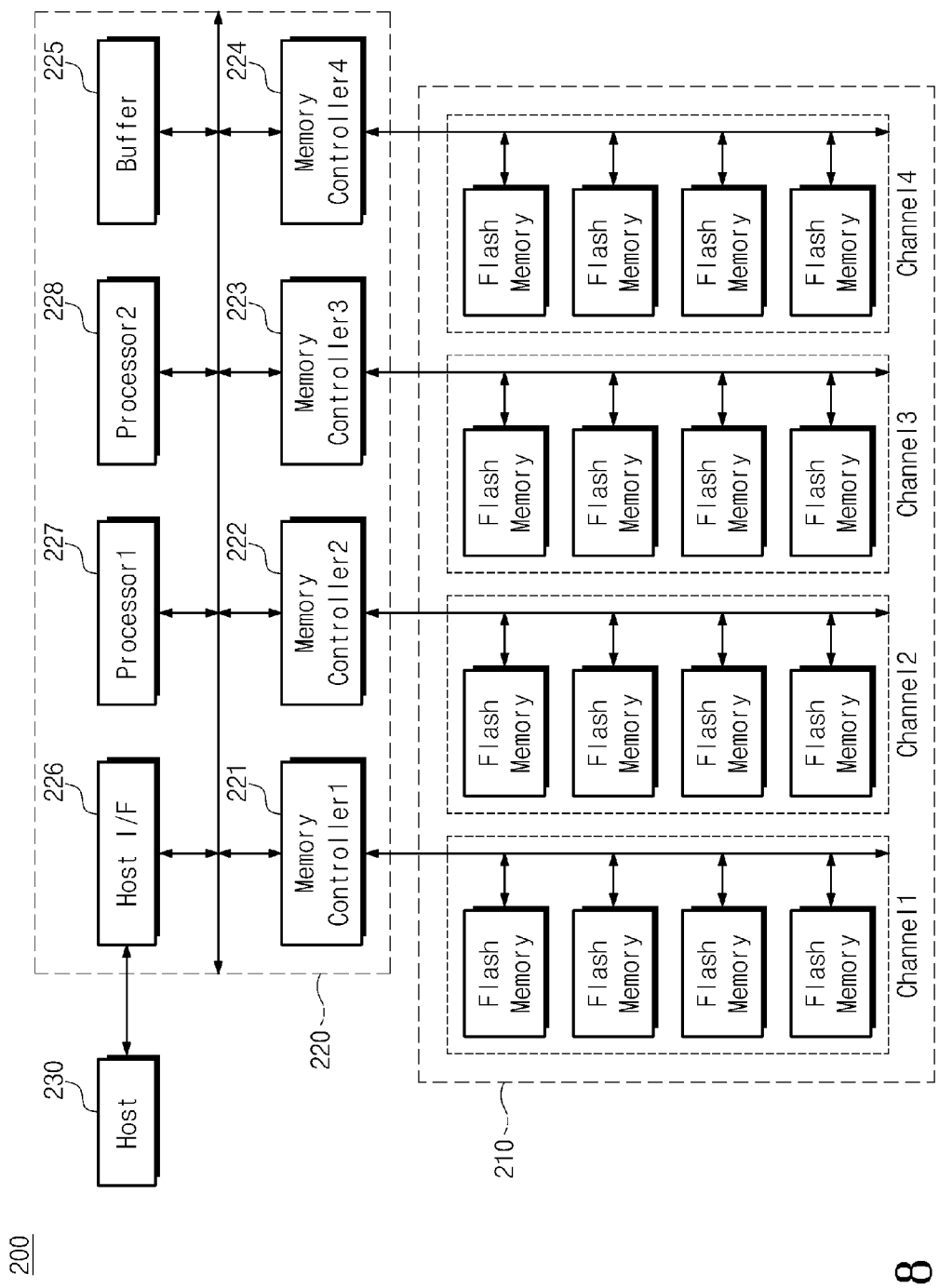
FIG. 8 is a block diagram illustrating a SSD and a host connected to the SSD according to another embodiment of the inventive concept.

FIG. 8 is a block diagram illustrating a SSD 200 and a host connected to SSD 200 according to another embodiment of the inventive concept.

Referring to FIG. 8, SSD 200 comprises a memory device 210 and a memory controller 220 for controlling memory device 210.

Memory device 210 is configured to store a large amount of data as a secondary storage medium. Memory device 210 comprises first through fourth channels Channel1 through Channel4, and four flash memories connected to each of first through fourth channels Channel1 through Channel4. In various alternative embodiments, four 2 Gbyte flash memories can be connected to each channel, additional or fewer flash memories can be connected to each of first through fourth channels Channel1 through Channel4, and additional or fewer channels can be included in memory device 110.

Memory controller 220 comprises first through fourth flash memory controllers 221 through 224, a buffer 225, a host interface 226, and first and second processors 227 and 228. Each of the first through fourth flash memory controllers 221 through 224 controls a plurality of flash memories connected to first through fourth channels Channel1 through Channel4.

Buffer 225 temporarily stores data to be transmitted to host 230, and temporarily stores data transmitted from host 230 to memory device 210. In some embodiments, buffer 225 is implemented as a DRAM.

Host interface 226 provides an interface between memory device 210 and host 230. In certain embodiments, host interface 226 comprises a SATA interface or a SCSI interface.

Each of first and second processors 227 and 228 controls first through fourth flash memory controllers 221 through 224, buffer 225, and host interface 226. Host 230 transmits input/output commands to host interface 226. The input/output commands relate to operations for reading data from memory device 210 and writing data in memory device 210.

Host interface 226 comprises a command queue for storing input/output commands transmitted from host 230. In some embodiments, the command queue is used to implement NCQ in a SATA2 interface.

First processor 227 performs a function of the first input/output context 127A of FIG. 3 and second processor 228 performs a function of second input/output context 128A of FIG. 3.

First and second processors 227 and 228 operate independent of each other. Accordingly, while first processor 227 executes an input/output command corresponding to a worst case input/output performance, second processor 228 processes a new input/output command. Consequently, SSD 200 can improve the average response time of input/output operations relative to certain conventional systems.

Figure 9:
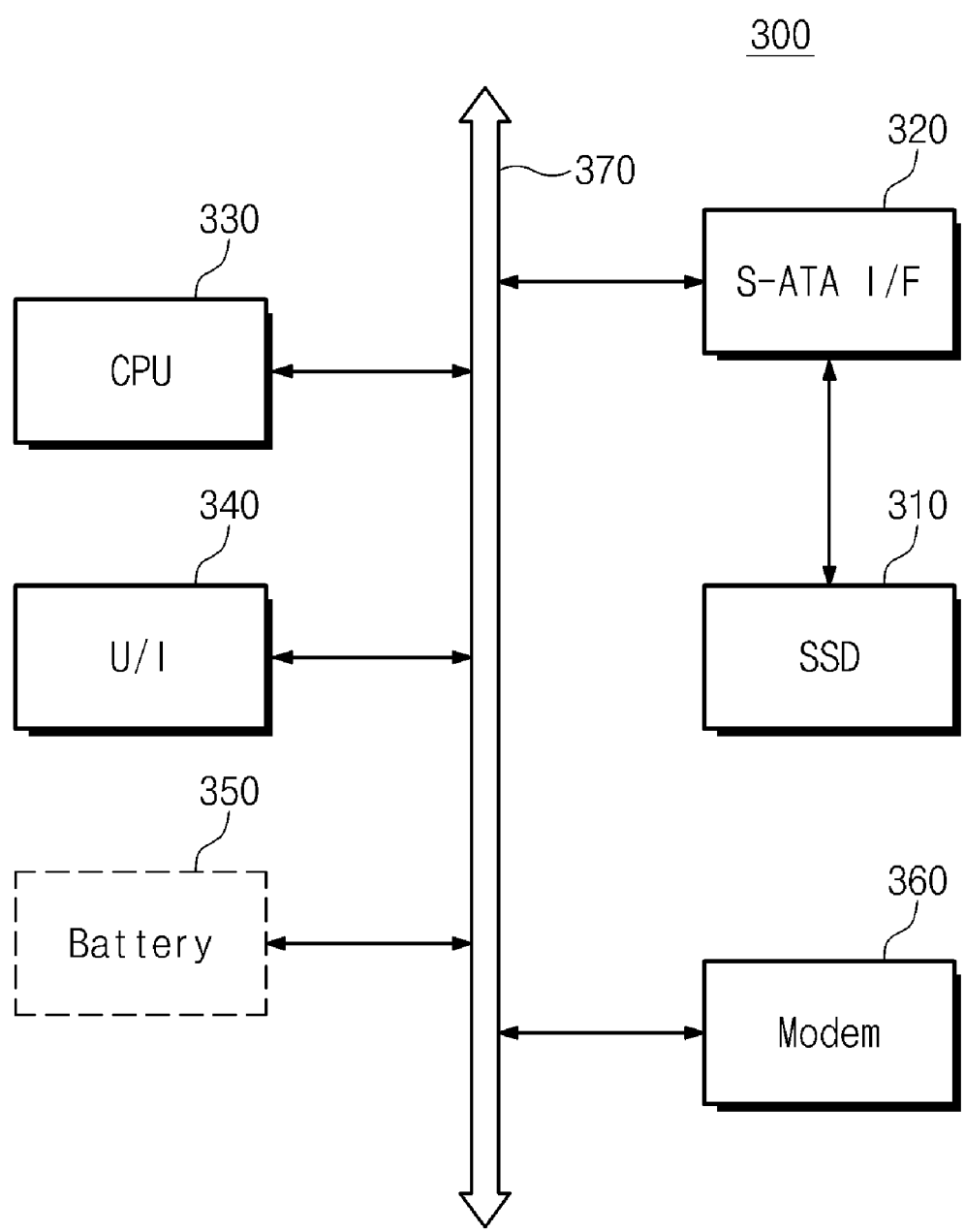
FIG. 9 is a block diagram illustrating a computer system comprising the SSD of FIG. 1 or FIG. 8.

FIG. 9 is a block diagram illustrating a computer system 300 comprising an SSD such as that illustrated in FIG. 1 or FIG. 8. Referring to FIG. 9, computing system 300 comprises a central processing unit (CPU) 330, a user interface 340, a modem 360 such as a baseband chipset, a SATA interface 320, and a SSD 310. These elements are connected to each other via a system bus 370.

CPU 330 controls SSD 310 through SATA interface 320. SSD 310 comprises an SSD such as that illustrated in FIG. 1 or 8.

Where computing system 300 is a mobile device, a battery 350 can be additionally provided to supply an operating voltage for computing system 300. Although not illustrated in the drawings, memory system 300 can be modified to further incorporate an application chipset, a camera image processor (CIS), or a mobile DRAM.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A solid state drive (SSD), comprising:
an input/output interface storing a plurality of input/output commands; and
a memory controller processing the input/output command, the memory controller comprising:
first and second input/output contexts that process input/output commands in an alternating sequence, wherein the input/output commands are transmitted to the first and second input/output contexts from the input/output interface; and
an input/output scheduler that schedules operations of the first and second input/output contexts;
wherein the input/output scheduler suspends execution of a first input/output command by the first input/output context upon determining that an execution time of the first input/output command exceeds an interval before a deadline time, and after suspending execution of the first input/output command, transmits a second input/output command to the second input/output context.

2. The SSD of claim 1, wherein the input/output scheduler resumes and continues execution of the first input/output command between a completion time of the second input/output command and a deadline time of the second input/output command.

3. The SSD of claim 1, wherein the input/output scheduler stores task progress information indicating a context of the first input/output command upon suspension of the execution of the first input/output command.

4. The SSD of claim 1, wherein the input/output interface comprises a command queue for storing the plurality of input/output commands, and further comprises a buffer for temporarily storing data corresponding to the plurality of input/output commands.

5. The SSD of claim 1, wherein the input/output interface comprises a serial advanced technology attachment (SATA) interface or a serial attached small computer system interface (SAS) interface.

6. The SSD of claim 1, wherein the first input/output context performs at least one of a garbage collection operation, a merge operation, a wear-leveling operation, and a block copyback operation.

7. The SSD of claim 1, further comprising:
a flash memory device that stores data programmed by one or more of the plurality of input/output commands; and
a flash memory controller controlling the flash memory device according to the plurality of input/output commands.

8. The SSD of claim 1, wherein the input/output interface comprises a command queue for native command queuing.

9. The SSD of claim 1, wherein execution of the first input/output command requires performance of a garbage collection operation, a merge operation, a wear-leveling operation, or a block copyback operation due to the absence of a clean page or memory block in an address designated by the first input/output command.

10. The SSD of claim 1, wherein the second input/output command comprises a read command of the SSD.

11. The SSD of claim 9, further comprising:
an over-provision area that stores data to be programmed in the designated address during the performance of the garbage collection operation, merge operation, wear-leveling operation, or block copyback operation.

12. A method of operating a solid state drive (SSD), comprising:
receiving a first input/output command;
commencing execution of the first input/output command; and
suspending execution of the first input/output command upon determining that an execution time of the first input/output command exceeds an interval prior to a deadline time of the first input/output command;
storing task progress data of the first input/output command upon suspending execution of the first input/output command; and
executing a second input/output command transmitted from the input/output interface during suspension of the first input/output command.

13. The method of claim 12, further comprising:
resuming execution of the first input/output command between a completion time of the second input/output command and a deadline time of the second input/output command.

14. The method of claim 13, wherein the first input/output command comprises a program operation and the second input/output command comprises a read operation.

15. The method of claim 14, wherein the first input/output command is designated to overwrite previously stored data, and overwriting the previously stored data comprises performing a garbage collection operation, a merge operation, a wear-leveling operation, or a block copyback operation.

16. The method of claim 11, further comprising storing a plurality of input/output commands in a command queue, and scheduling execution of the plurality of input/output commands using a native command queuing protocol.

17. The method of claim 11, wherein the first and second input/output commands are memory access commands for a flash memory device.

18. A solid state drive (SSD), comprising:
an input/output interface comprising a command queue that stores a plurality of input/output commands;
a plurality of processors configured to communicate with a host through the input/output interface;
a plurality of memory controllers; and
a plurality of memory channels corresponding, respectively, to the plurality of memory controllers, each of the memory channels comprising a plurality of flash memory devices;
wherein the plurality of processors receive a plurality of input/output commands from the command queue and execute the input/output commands in an alternating fashion;
wherein a first one of the plurality of processors initiates a first input/output command and suspends the first input/output command upon determining that an expected latency of the command extends beyond a deadline of the first input/output command; and wherein a second one of the plurality of processors executes a second input/output command while the first input/output command is suspended, and the first input/output command is re-initiated during a laxity time between completion of the second input/output command and a deadline of the second input/output command.

19. The SSD of claim 18, wherein the first input/output command comprises a program command for a flash memory device, and the second command comprises a read command.

20. The SSD of claim 18, further comprising:
an input/output command scheduler for transferring control between the first and second processors.

* * * * *